(12) United States Patent
Blias

(10) Patent No.: US 8,407,007 B2
(45) Date of Patent: Mar. 26, 2013

(54) ANISOTROPIC DEPTH VELOCITY MODEL ESTIMATION ABOVE THE RECEIVER ARRAY IN WALKAWAY OR 3D VSP DATA

(75) Inventor: Emanouil Blias, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 428 days.

(21) Appl. No.: 12/625,152

(22) Filed: Nov. 24, 2009

(65) Prior Publication Data

US 2010/0133010 A1    Jun. 3, 2010

Related U.S. Application Data

(60) Provisional application No. 61/119,230, filed on Dec. 2, 2008.

(51) Int. Cl.
*G01V 1/48* (2006.01)
(52) U.S. Cl. ............... 702/11; 702/18; 367/27; 367/38
(58) Field of Classification Search ........ 702/6, 11–134; 181/108, 11, 112; 367/14, 25, 27, 36, 38, 367/68
See application file for complete search history.

(56) References Cited

U.S. PATENT DOCUMENTS

| 5,909,655 A * | 6/1999 | Canadas et al. ........... 702/17 |
| 2007/0115755 A1 * | 5/2007 | Grechka et al. ........... 367/75 |
| 2008/0221796 A1 * | 9/2008 | Lou et al. ............... 702/6 |

OTHER PUBLICATIONS

Postma; "Wave Propagation in a Stratifield Medium," Geophysics, vol. XX, No. 4, (Oct. 1955), pp. 780-806.
Castle; "A theory of normal moveout," Geophysics, vol. 59, No. 6 (Jun. 1994), pp. 983-999.
Dix; "Seismic Velocities From Surface Measurements," Geophysics, vol. XX, No. 1 (Jan. 1955), pp. 68-86.
Blias, "Long-spreadlength approximations to NMO function for a multi-layered subsurface," CSEG Recorder, Mar. 2007, pp. 37-42.
Blias; Analytical description of azimuthally-dependent NMO velocity and Dix type inversion for horizontally layered, azimuthally anisotropic media, CSEG Recorder, May 2007, pp. 31-38.
Lou et al.; "Vector Kirchhoff Migration of First Order Downgoing Multiples from VSP Data," SEG/San Antonio 2007 Annual Meeting, pp. 3059-3063.
Reiter et al.; "Imaging with deep-water multiples," Geophysics, vol. 56, No. 7, (Jul. 1991), pp. 1081-1086.
Gaiser; "Transversely Isotropic Phase Velocity Analysis From Slowness Estimates," Journal of Geophysical Research, vol. 95, No. B7, Jul. 10, 1990, pp. 11,241-11,254.
Miller; "An exact inversion for anisotropic moduli from phase slowness data," Journal of Geophysical Research, vol. 99, No. B11, Nov. 10, 1994, pp. 21,651-21,657.
Alkhalifah et al.; "Velocity analysis for transversely isotropic media," Geophysics, vol. 60, No. 5 (Sep.-Oct. 1995), pp. 1550-1566.

(Continued)

*Primary Examiner* — Manuel L Barbee
(74) *Attorney, Agent, or Firm* — Mossman Kumar & Tyler PC

(57) ABSTRACT

A walkaway VSP survey is carried out using a receiver array. Using a vertical VSP survey and arrival times of surface multiples on the walkaway VSP, vertical interval velocities and the anisotropy parameters $\delta$ and $\epsilon$ are estimated. This may then be used to process surface seismic data to do a prestack depth migration of surface seismic data and used for interpretation. For multi-azimuthal walkaway or 3D VSP data, we determine two VTI parameters $\epsilon$ and $\delta$ for multi-azimuth vertical planes. Then we determine five anisotropic interval parameters that describe P-wave kinematics for orthorhombic layers. These orthorhombic parameters may then be used to process surface seismic data to give a stacked image in true depth and for the interpretation purposes.

18 Claims, 5 Drawing Sheets

OTHER PUBLICATIONS

Leaney; "Look-ahead walkaways using effective VTI models," SEG 2000 Expanded Abstracts, pp. 1-5.

He et al.; "Annual Meeting Selection, 3D wave-equation interferometric migration of VSP free-surface multiples," Geophysics, vol. 72, No. 5 (Sep.-Oct. 2007), pp. S195-S203.

Tsvankin; "Anisotropic parameters and P-wave velocity for orthorhombic media," Geophysics, vol. 62, No. 4 (Jul.-Aug. 1997), pp. 1292-1309.

* cited by examiner

ANISOTROPIC DEPTH VELOCITY MODEL ESTIMATION ABOVE THE RECEIVER ARRAY IN WALKAWAY OR 3D VSP DATA

CROSS-REFERENCES TO RELATED APPLICATIONS

This application claims priority from U.S. Provisional Patent Application Ser. No. 61/119,230 filed on Dec. 2, 2008.

BACKGROUND OF THE DISCLOSURE

1. Field of the Disclosure

This disclosure relates to a method of geophysical prospecting which improves the accuracy of depth velocity model building and seismic migration. Specifically, the disclosure uses a zero-offset and walkaway VSP, multi-azimuth or 3D VSP survey for determination of anisotropy parameters characterizing subsurface velocities that may be used for imaging of reflections.

2. Description of the Related Art

In surface seismic exploration, energy imparted into the earth by a seismic source reflects from subsurface geophysical features and is recorded by a multiplicity of receivers. This process is repeated numerous times, using source and receiver configurations which may either form a line (2-D acquisition) or cover an area (3-D acquisition). The data which results is processed to produce an image of the reflector using a procedure known as migration.

Conventional reflection seismology utilizes surface sources and receivers to detect reflections from subsurface impedance contrasts. The obtained image often suffers in spatial accuracy, resolution and coherence due to the long and complicated travel paths between source, reflector, and receiver.

Prior art methods have used a walkaway Vertical Seismic Profile (VSP) survey to estimate formation velocities within and below the receiver array. Common to the prior art methods is an assumption that the earth is isotropic. It has been recognized for several years that the earth is anisotropic, i.e., that the velocity of compressional waves depends upon the direction of propagation.

P-wave anisotropy is manifested by a change in the compressional wave velocity with direction of propagation in earth formations due to combined effects of sedimentary layering and the intrinsic anisotropy of the rock. Shales, in particular, could exhibit more than a 20% difference in P-wave velocities parallel to bedding and P-wave velocities perpendicular to bedding. Sandstones and limestones usually show smaller differences in velocity with direction of propagation. Postma (1955) showed that a type of anisotropy called transverse isotropy could be exhibited by seismic waves propagating through a thin layering of isotropic materials.

Determination of anisotropic velocities from surface seismic data is difficult due to the relatively poor data quality and the relatively low frequencies of surface seismic data. Nevertheless, there is prior art on the determination of an anisotropic velocity model for depth imaging of seismic data. See, for example, U.S. Pat. No. 6,864,890 to Meek et al.

The present disclosure addresses the problem of determining anisotropic formation velocities using a walkaway VSP survey, multi-azimuth walkaways or 3D VSP survey. In a walkaway VSP survey, measurements are made using a plurality of receivers in a borehole responsive to excitation of at least one seismic source at a plurality of distances from the wellbore. The estimated velocities may then be used for migration of the walkaway(s)/3D VSP data or of surface seismic data and depth velocity model building. This method is particularly useful in the drilling of offset wells where an initial well that may or may not be productive has been drilled. Using the method of the present disclosure, it is possible to image the subsurface of the earth away from the initial well.

SUMMARY OF THE DISCLOSURE

One embodiment of the disclosure is a method of evaluating an earth formation. The method includes: deploying an array of seismic receivers in a borehole and recording seismic signals in the array of receivers responsive to an activation at least one seismic source on the surface of the earth at least one location offset from the borehole; estimating, from travel times of seismic waves from the at least one location that have been reflected at an interface in the earth formation and the surface of the earth to the plurality of receivers, a velocity model including velocities of vertically propagating seismic waves in a plurality of intervals, and an anellipticity parameter related to a normal moveout velocity of compressional waves for the plurality of intervals; and using the estimated velocity model for producing an image of the earth formation.

Another embodiment of the disclosure is a system configured to evaluate an earth formation. The system includes: a plurality of seismic receivers configured to be conveyed in a borehole and recording seismic signals responsive to an activation at least one seismic source on the surface of the earth at least one location offset from the borehole; and at least one processor configured to: estimate, from travel times of seismic waves from the at least one location that have been reflected at an interface in the earth formation and the surface of the earth to the plurality of receivers, a velocity model including velocities of vertically propagating seismic waves in a plurality of intervals, and an anellipticity parameter related to a normal moveout velocity of compressional waves for the plurality of intervals; and use the estimated velocity model for producing an image of the earth formation.

Another embodiment of the disclosure is a computer-readable medium product having stored thereon instructions that when read by at least one processor cause the at least one processor to execute a method, the method comprising: estimating, from first travel times of seismic waves from at least one location offset from a borehole that have been reflected at an interface in the earth formation and the surface of the earth to a plurality of receivers in the borehole and second travel times of seismic waves to the plurality of receivers from at least one additional location near the borehole, a velocity model including at least two anisotropy parameters related to a normal moveout curve of compressional waves for the plurality of intervals; and using the estimated velocity model for producing an image of the earth formation.

BRIEF DESCRIPTION OF THE DRAWINGS

The present disclosure is best understood by reference to the attached figures in which like numerals refer to like elements, and in which.

DETAILED DESCRIPTION OF THE DISCLOSURE

Figure 1:
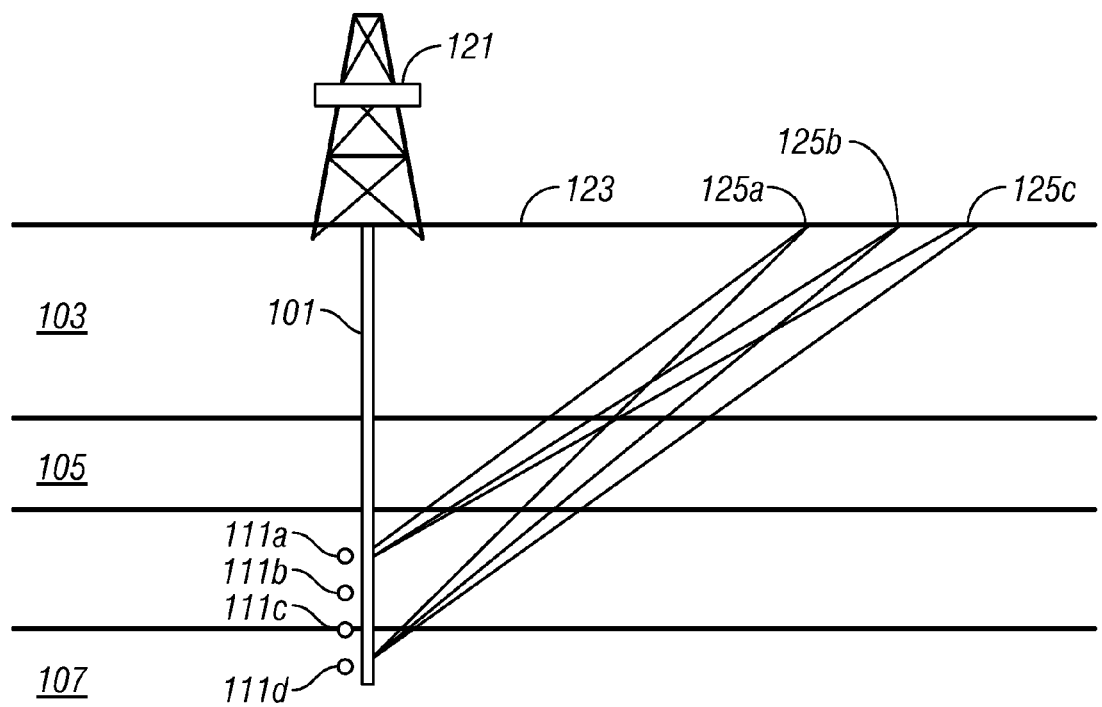
FIG. 1 illustrates the geometry of data acquisition of a walkaway VSP according to the present disclosure.

For the present disclosure, the acquisition geometry of a walkaway VSP is illustrated in FIG. 1. Shown therein is the surface of the earth 123 with a rig 121 thereon. This may be a drilling rig or it may be a mast rig which conveys a wireline into a borehole 101. The borehole 101 penetrates layers 103, 105 . . . . Positioned in the borehole 101 are seismic sensors denoted by 111a, 111b, 111c, 111d . . . . Each of the sensors may include a hydrophone, a single-component geophone or a multi-component geophone. Data for a single offset VSP is typically acquired using a single seismic source such as 125a at the surface (or within a body of water at the surface). Exemplary raypath which depicts the propagation of seismic energy from the source 125a to the detectors 111a and 111d are shown.

Figure 2:
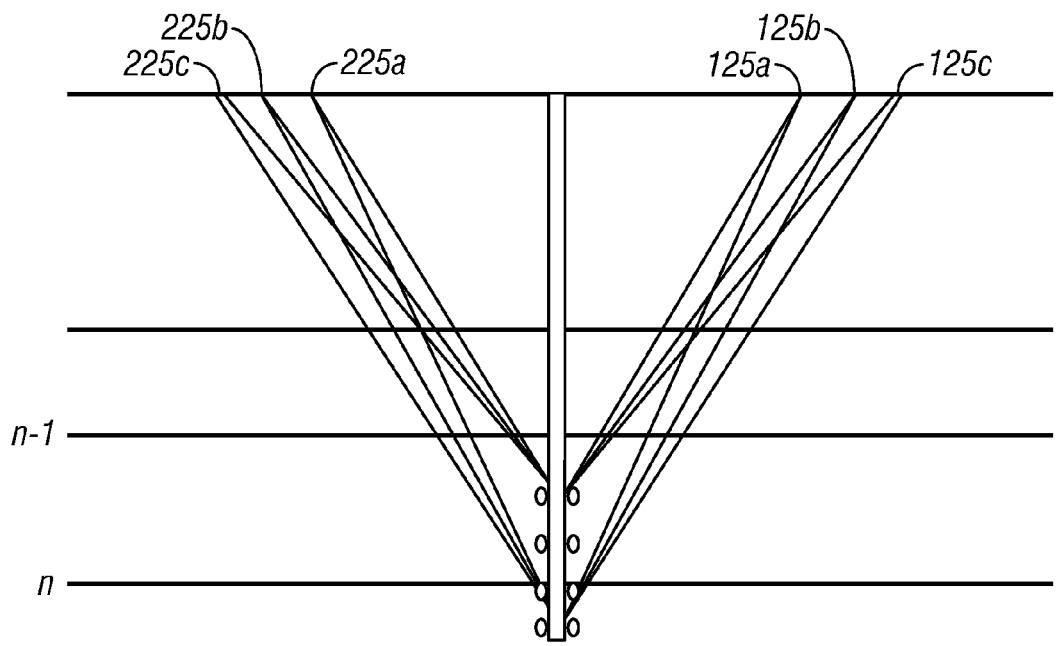
FIG. 2 illustrates the simulated geometry of a surface seismic reflection survey using a walkaway VSP survey.
Figure 3:
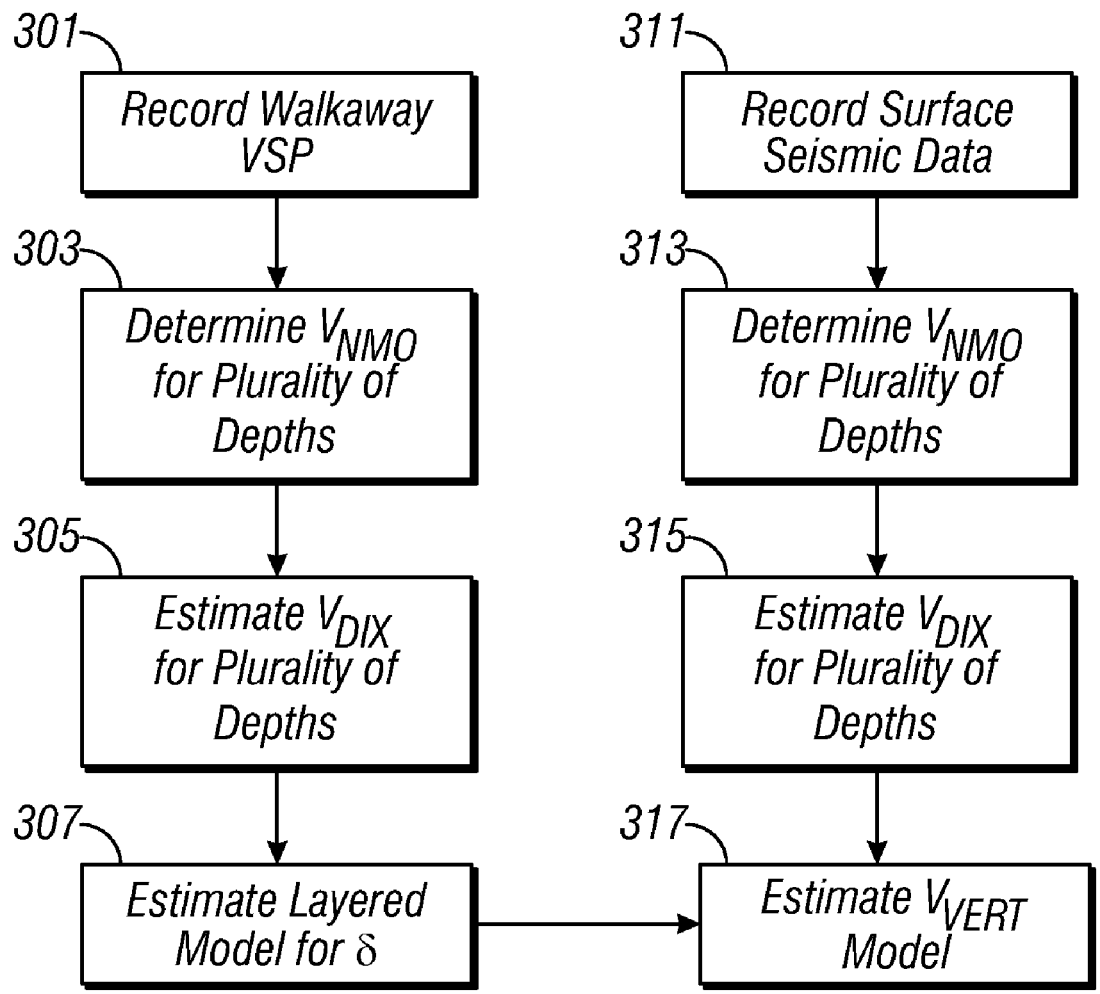
FIG. 3 shows a flow chart illustrating how the method of the present disclosure may be used for processing seismic data.

FIG. 2 shows the simulated geometry of a surface seismic survey derived from the walkaway VSP survey of FIG. 1. A vertical borehole has been assumed, the sources have been "reflected" in the borehole to simulated receiver locations on the surface 225a, 225b, 225c . . . similarly, the raypaths have also been reflected to give simulated raypaths on the left side of the borehole.

Figure 4:
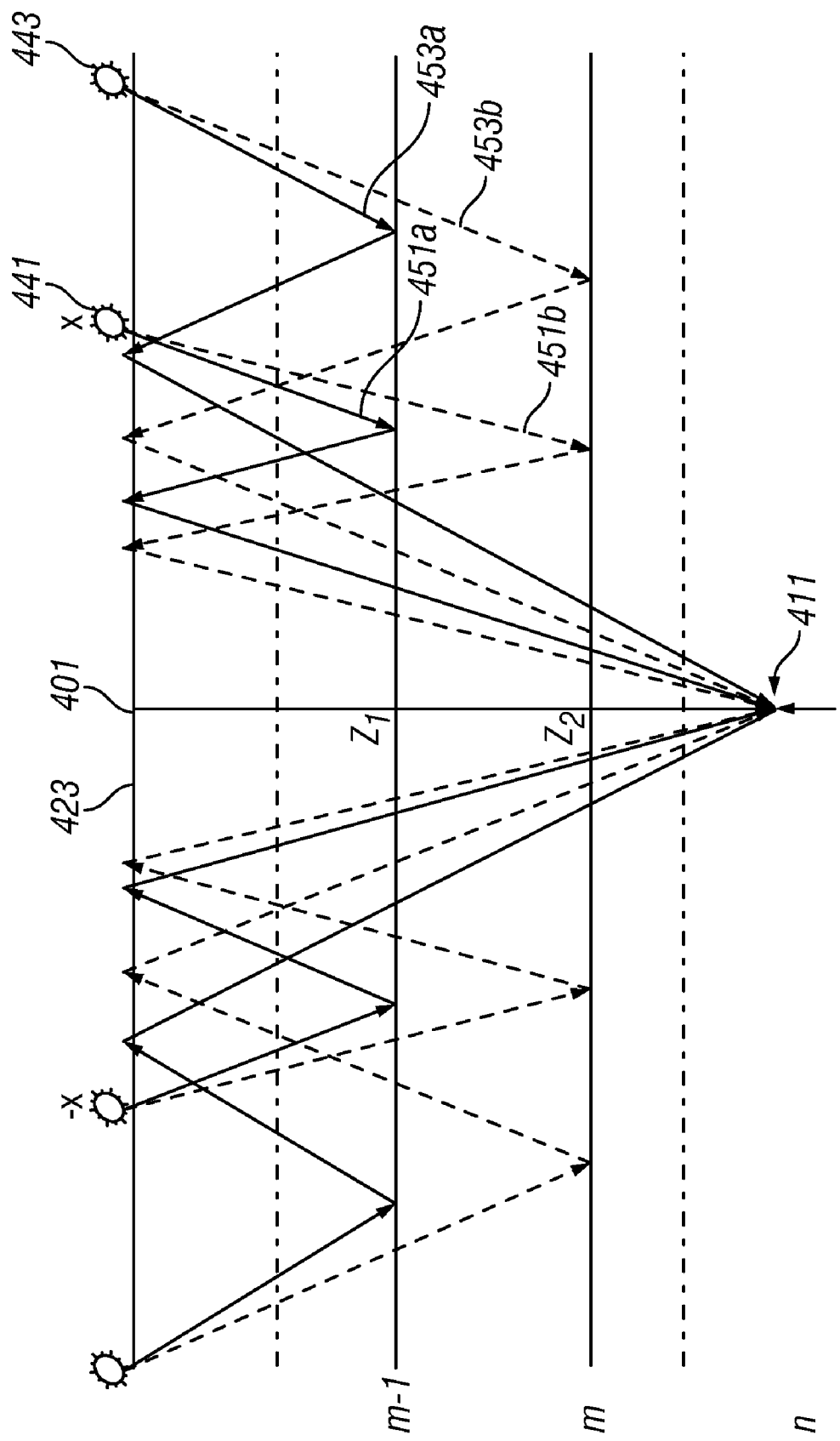
FIG. 4 shows the simulated geometry of a surface reflection survey including multiples using a walkaway VSP survey.

Let $t_{m-1,n}(x,z)$ be time arrival for downgoing P wave reflected from the interface "m−1" between the surface and the receiver array, blue arrows in FIG. 4. Here x is the offset and z is a receiver depth. Let $t_{m,n}(x,z)$ be time arrival for downgoing P wave reflected from the next interface "m" between the surface and the receiver array and the surface, blue arrows in FIG. 4; n is the number of the layers above the receiver.

In one embodiment of the disclosure, the traveltimes $t_{m,n}$ of the wave, reflected from the boundary "m" and the surface, are approximated by a shifted hyperbola approximation.

$$t_{m,n}(x) = t_{0,m,n}\left(1 - \frac{1}{A_{m,n}}\right) + \frac{1}{A_{m,n}}\sqrt{t_{0,m,n}^2 + A_{m,n}\frac{x^2}{V_{NMO,m,n}^2}}, \quad (1)$$

where $$t_{0,m,n} = 3\sum_{k=1}^{m}\frac{h_k}{v_k} + \sum_{k=m+1}^{n}\frac{h_k}{v_k}, \quad (2)$$

$$\frac{1}{V_{NMO,m,n}^2} = \frac{3\sum_{k=1}^{m}\frac{h_k}{v_k} + \sum_{k=m+1}^{n}\frac{h_k}{v_k}}{3\sum_{k=1}^{m}h_k v_k(1+2\delta_k) + \sum_{k=m+1}^{n}h_k v_k(1+2\delta_k)}, \quad (3)$$

$$A_{m,n} = \frac{\left(3\sum_{k=1}^{m}\frac{h_k}{v_k} + \sum_{k=m+1}^{n}\frac{h_k}{v_k}\right)\left(3\sum_{k=1}^{m}h_k v_{P,k}^3 B_k + \sum_{k=m+1}^{n}h_k v_k^3 B_k\right)}{\left(3\sum_{k=1}^{m}h_k v_k + \sum_{k=m+1}^{n}h_k v_k\right)^2} \quad (4)$$

Here $h_k$ is the thickness of layer number "k", $v_k$ is the vertical P velocity of the k-th layer, $\delta_k$ is Thomsen's anisotropy parameter related to NMO velocity.

Thomsen defined the parameters $\delta$ and $\epsilon$ as $$\delta = \frac{(C_{13}+C_{44})^2 - (C_{33}-C_{44})^2}{2C_{33}(C_{33}-C_{44})},$$

$$\varepsilon = \frac{C_{11}-C_{33}}{2C_{33}}$$

where the elastic moduli for the TI material are given by the matrix $$\begin{bmatrix} C_{11} & C_{11}-2C_{66} & C_{13} & 0 & 0 & 0 \\ C_{11}-2C_{66} & C_{11} & C_{13} & 0 & 0 & 0 \\ C_{13} & C_{13} & C_{33} & 0 & 0 & 0 \\ 0 & 0 & 0 & C_{44} & 0 & 0 \\ 0 & 0 & 0 & 0 & C_{44} & 0 \\ 0 & 0 & 0 & 0 & 0 & C_{66} \end{bmatrix}.$$

The coefficient $B_k$ is given by:

$$B_k = 1 + 8\frac{(\varepsilon_k - \delta_k)}{(1+2\delta_k)}\frac{1+2\delta_k - \gamma_k^2}{(1+2\delta_k)(1-\gamma_k^2)}$$

The ratio $$\frac{\gamma^2}{1-\gamma^2}$$

lies between 0 and 0.5. Making the assumption that $$\frac{\gamma^2}{1-\gamma^2} = 0.25,$$

eqn (4) can gives:

$$B_k = 1 + 8\frac{\varepsilon_k - \delta_k}{(1+2\delta_k)}\left(1 + \frac{\delta_k}{2(1+2\delta_k)}\right) \quad (5)$$

This relation has a relative error less than 1%.

Figure 5:
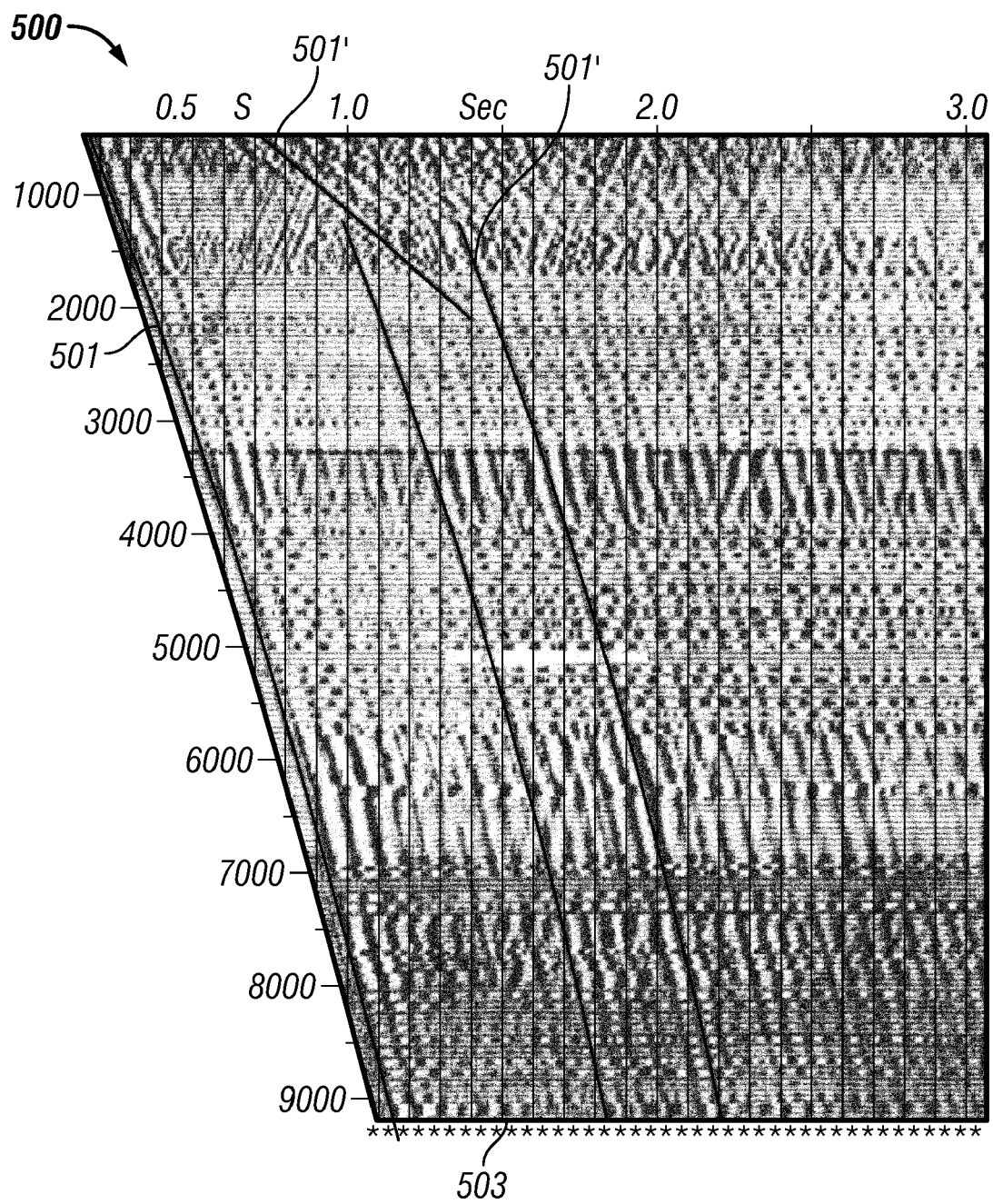
FIG. 5 (prior art) shows an exemplary VSP showing reflections and surface multiples.

Similar formulae can be written for the time $t_{m-1,n}(x)$, corresponding to the multiple wave, generated by the free surface and boundary number m−1. This is done by replacing m by m−1 in eqna. (1)-(4). Surface multiples are easy to identify on common offset gathers with the smallest offset or zero-offset VSP. An example is seen in FIG. 5 that shows an exemplary zero-offset VSP. On this gather, the downgoing first arrival is indicated by 500, exemplary reflected signals are indicated by 501 and 503 and a surface multiple of 501 is indicated by 501'.

After that, knowing zero-offset times, to find parameters $V_{NMO}$ and A in eqn (1), a semblance coherence three-term NMO analysis for common receiver gather is carried out that gives the NMO function t(x) (parameters $V_{NMO}$ and A). To determine three parameters for NMO function, we can use any of equations, considered by Blias (2007a) discussed above.

Knowing $t_0$, $V_{NMO}$, and A for two boundaries m−1 and m, gives a formula for coefficient $B_{m,n}$ calculation:

$$B_m = \frac{(A_{m,n}t_{0,m,n}V_{NMO,m,n}^4 - A_{m-1,n}t_{0,m-1,n}V_{NMO,m-1,n}^4)}{(t_{0,m,n}V_{NMO,m-1,n}^2 - t_{0,m-1,n}V_{NMO,m-1,n}^2)^2}. \quad (6)$$

Depending upon whether or not zero offset VSP data are available for layer m, different approaches may be taken.

When such zero-offset data are not available, the following relation is known in the art:

$$V_{Vert,m}\sqrt{1+2\delta_m} = V_{Dix} \quad (7)$$
$$= \sqrt{\frac{t_{0,m,n}V_{NMO,m,n}^2 - t_{0,m-1,n}V_{NMO,m-1,n}^2}{t_{0,m,n} - t_{0,m-1,n}}}.$$

where $V_{Dix}$ is a an estimate for the interval velocity through Dix formula. Assuming that $\delta$ is relatively small ($\delta_k$<0.25, that is weak anisotropy), eqn. (5) can be written as:

$$B_k = 1 + 8\eta_k, \quad (8)$$
where
$$\eta_k = \frac{\varepsilon_k - \delta_k}{(1+2\delta_k)}. \quad (9)$$

is an anellipticity parameter introduced by Tsvankin and Akhalifah. It is thus possible to calculate the interval anellipticity parameter $\eta_m$ and the product $V_{vert,m}\sqrt{1+2\delta_m}$ for each receiver n. It is not possible to estimate the vertical velocity, $\delta$ and $\epsilon$. However, if an assumption is made about a relation between $\delta$ and $\epsilon$, it is possible to estimate values of the vertical velocity, $\delta$ and $\epsilon$. For example, if elliptical anisotropy is assumed, then $\delta=\epsilon$, $\eta=0$, B=1. Using estimated values of the vertical velocity, $\delta$ and $\epsilon$ with these simplifying assumptions makes it possible to perform a prestack depth migration of surface seismic data.

When zero offset VSP that covers layer m is available, then it is possible to estimate both anisotropic parameters $\epsilon$ and $\delta$. From first breaks in zero offset VSP data the vertical velocity $V_{Vert}$ can be estimated. Then $\delta$ can be estimated from eqn (7):

$$\delta_m = \frac{1}{2}\left(\frac{1}{V_{Vert,m}}\sqrt{\frac{t_{0,m,n}V_{NMO,m,n}^2 - t_{0,m,n}V_{NMO,m-1,n}^2}{t_{0,m,n} - t_{0,m-1,n}}} - 1\right), \quad (10)$$
giving
$$\varepsilon_m = \delta_m + \frac{B_m - 1}{8M_m}, \quad (11)$$
where
$$M_m = \frac{1}{(1+2\delta_m)}\left(1 + \frac{\delta_m}{2(1+\delta_m)}\right). \quad (12)$$

This implies that to determine all three parameters $V_{Vert}$, $\epsilon$ and $\delta$ above the walkaway receiver array, it is desirable to acquire additional set of data: zero offset VSP with the receiver array that covers the layers of interest. This zero offset VSP data is also used to tie downgoing events on the walkaway VSP data to the multiple reflections by using the same zero-offset times on both sets of data. To determine both anisotropic parameters $\epsilon$ and $\delta$ in VTI subsurface above the shallowest walkaway receiver and use them for imaging of surfaces seismic data, zero-offset VSP data should be acquired at as shallow a depth as possible. Then estimated values of $\delta$ and $\epsilon$ may be averaged to provide a final estimate and its standard deviation that provides the information about estimation reliability.

Another embodiment of the disclosure is directed towards a VTI medium with vertical fracturing. This is a particular example of an Orthorhombic horizontally-layered medium with a horizontal symmetry plane. Tsvankin's notations (Tsvankin, 1997) may be used to describe orthorhombic anisotropy. For P-wave, Tsvankin's notation includes vertical velocity and five dimensionless parameters: the VTI Thomsen's parameters $\delta_2$ and $\epsilon_2$ for [$x_1$, $x_3$] symmetry plane, $\delta_1$ and $\epsilon_1$ for [$x_2$, $x_3$] symmetry plane and parameter $\delta_3$ for in the horizontal symmetry plane [$x_1$,$x_3$]. Knowing vertical velocity from zero-offset VSP, it is possible to estimate anisotropic coefficients $\delta_1$ and $\delta_2$ and symmetry azimuth $\theta$ from NMO ellipse obtained from multi-azimuth first breaks (Blias, CSEG Recorder, May 2007).

Coefficients $\epsilon_1$, $\epsilon_2$, and $\delta_3$ can be estimated through first breaks non-hyperbolic approximations assuming weak anisotropy with respect to these parameters. In this case, each vertical plane with azimuth $\alpha$ can be considered as VTI plane (Tsvankin, 1997).

Coefficients $\epsilon(\alpha)$ and $\delta(\alpha)$ in the vertical plane with azimuth $\alpha$ are estimated using Dix type inversion described for VTI layered model. To estimate parameter $\epsilon_1$, $\epsilon_2$ and $\delta_3$, ab equation derived by Tsvankin (1997) is used:

$$\epsilon(\alpha_k)=\epsilon_1\sin^4(\alpha_k-\theta)+\epsilon_2\cos^4(\alpha_k-\theta)+(2\epsilon_2+\delta_3)\sin^2(\alpha_k-\theta)\cos^2(\alpha_k-\theta)$$

Using the least-square method, these parameters are estimated by minimizing quadratic function $f(\epsilon_1,\epsilon_2,\delta_3)$:

$$F(\varepsilon_1, \varepsilon_2, \delta_3) = \sum_{k=1}^{n} \left[\varepsilon(\alpha_k) - \varepsilon_1\sin^4(\alpha_k - \theta) - \varepsilon_2\cos^4(\alpha_k - \theta) - (2\varepsilon_2 + \delta_3)\sin^2(\alpha_k - \theta)\cos^2(\alpha_k - \theta)\right]^2$$

To estimate $\epsilon(\alpha)$ and $\delta(\alpha)$ for several azimuths $\alpha$, multi-azimuthal walkaway survey or 3D VSP data are needed. Multi-azimuthal walkaway geometry may include at least 6 walkaway lines through the well, preferably at 30° increment. For stable and more reliable estimates, it's better to have 12 walkaway lines with 15° degrees increment or even 18 walkaway lines with 10° increment, depending on noise level. 3D VSP data provides azimuthal estimates with many sectors. Modeling shows that 12 sectors with 15 degrees each provide stable estimates of five anisotropic orthorhombic parameters $\epsilon_1$, $\epsilon_2$, $\delta_1$, $\delta_2$ and $\delta_3$.

Figure 6:
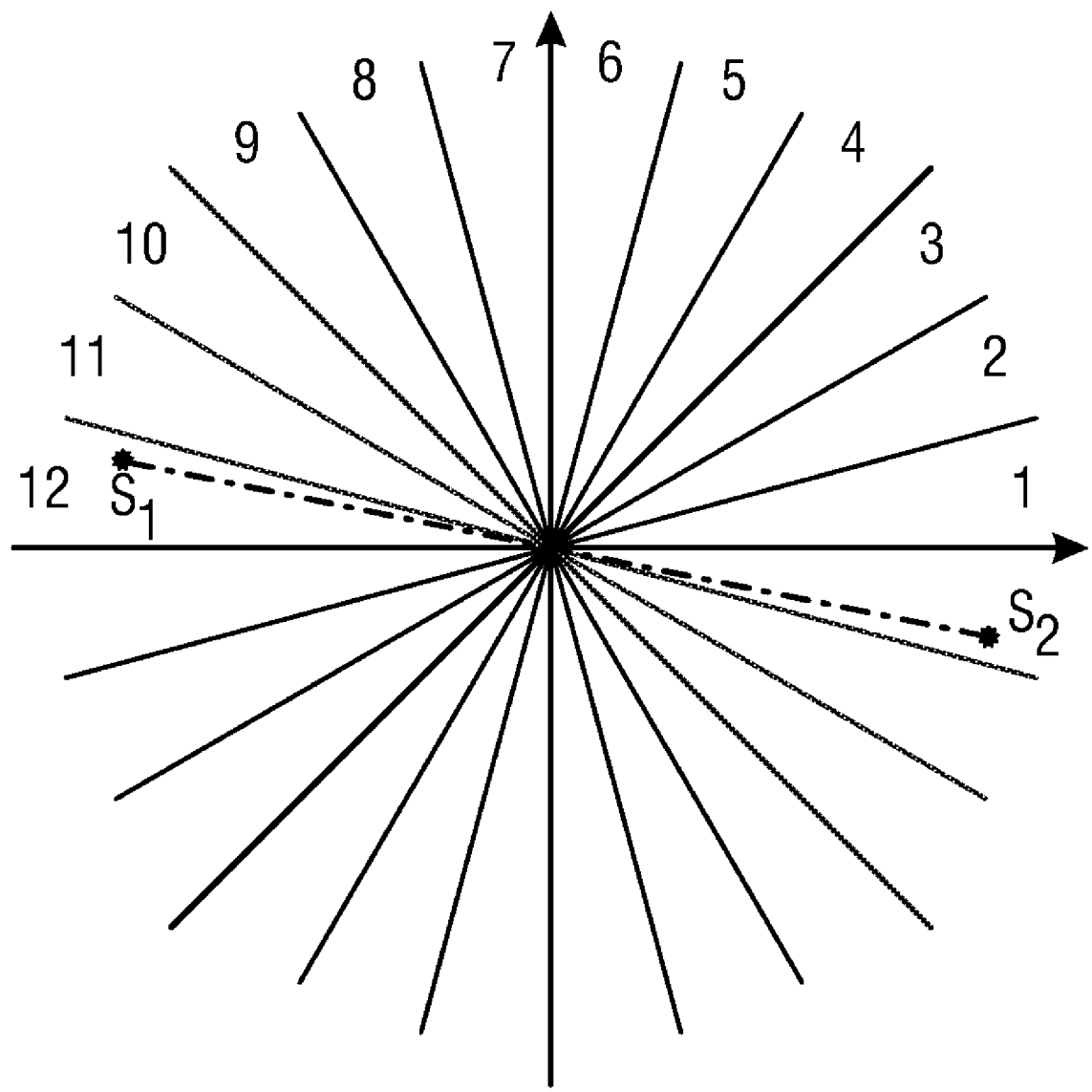
FIG. 6 shows sectors created from 3D VSP geometry to determine VTI parameters in each sector.

FIG. 6 illustrates the division the circle into 12 azimuths and added times with symmetrical offsets $S_1$ and $S_2$ to eliminate influence of velocity gradient. We also stack opposite (symmetrical) offsets to simulate surface seismic NMO curve T(x) for further Dix-type inversion for interval anisotropic parameters. Number of sectors that we divide the 3D VSP survey circle may vary from 6 (30° each) to 18 (10° each). For multi-azimuthal walkaway geometry, the number of azimuths to calculate VTI parameters are the same as the number of walkaway lines.

Acquisition of the data may be done using the multi level receiver (MLR) of Baker Hughes Incorporated that can be configured from 1 to 100 levels. For 3D VSP data, a 300-channel SERCEL equipment with three-component hundred level borehole tool (one vertical and two horizontal components) may be used. This is for exemplary purposes only and not to be construed as a limitation. Use of such a system speeds up the data acquisition. The downhole receivers can be run in combination with other logging services, either wireline or pipe-conveyed, reducing the number of trips into the well and saving rig time. In high-angle wells, the downhole receiver can be conveyed on drill pipe or coiled tubing and also run in combination with a variety of openhole logging services greatly reducing rig time. In one embodiment, the zero-offset VSP survey is run up to the possible shallowest level. This provides vertical velocities above the receivers that are used to calculate interval parameter $\epsilon$ above the walkaway-3D receivers. Inversion procedure can be run for each walkaway(s)/3D VSP receiver. Then the result anisotropic parameters can be averaged. This provides much more stable estimates of anisotropic parameters and also uncertainty of these estimates by calculating standard deviation.

The inversion and migration methodology described above may be implemented on a general purpose digital computer. As would be known to those versed in the art, instructions for the computer reside on a machine readable memory device such as ROMs, EPROMs, EAROMs, Flash Memories and Optical disks. These may be part of the computer or may be linked to the computer by suitable communication channels, and may be even at a remote location. Similarly, seismic data of the type discussed above may be stored on the computer or may be linked through suitable communication channels to the computer. The communication channels may include the Internet, enabling a user to access data from one remote location and get the instructions from another remote location to process the data. The instructions on the machine readable memory device enable the computer to access the VSP data and process the data according to the method described above.

While the foregoing disclosure is directed to the preferred embodiments of the disclosure, various modifications will be apparent to those skilled in the art. It is intended that all such variations within the scope and spirit of the appended claims be embraced by the foregoing disclosure.

What is claimed is:

1. A method of evaluating an earth formation, the method comprising:
    deploying an array of seismic receivers in a borehole and recording seismic signals in the array of receivers responsive to an activation of at least one seismic source on the surface of the earth at at least one location offset from the borehole;
    estimating, using at least one processor, from travel times of seismic waves from the at least one location that have been reflected at an interface in the earth formation and the surface of the earth to the plurality of receivers, a velocity model including velocities of vertically propagating seismic waves in a plurality of intervals, and an anellipticity parameter related to a normal moveout velocity of compressional waves for the plurality of intervals; and
    using the estimated velocity model for producing an image of the earth formation above the array of seismic receivers.

2. The method of claim 1 wherein the at least one location further comprises at least one additional location close to the borehole, the method further comprising:
    using travel times of seismic waves to the plurality of receivers from at least one additional location and the velocity model to provide an updated velocity model including at least two anisotropy parameters related to a normal moveout curve of compressional waves for the plurality of intervals.

3. The method of claim 2 further comprising:
    using the updated velocity model for producing an image of the earth formation; and
    using the produced image for drilling operations.

4. The method of claim 2 wherein the at least one location comprises a plurality of locations defining a multi-azimuthal walkaway geometry, and the at least two anisotropy parameters further comprise five orthorhombic anisotropy parameters $\epsilon_1$, $\epsilon_1$, $\delta_1$, $\delta_2$ and $\delta_3$ related to a normal moveout velocity of compressional waves for the plurality of intervals.

5. The method of claim 2 further comprising estimating one of the at least two anisotropy parameters by approximating a moveout function representing the travel times by a shifted parabola.

6. The method of claim 1 further comprising using the produced image for drilling operations.

7. The method of claim 1 further comprising, using, for at least one of the plurality of seismic receivers, 3-component receivers.

8. The method of claim 1 further comprising deploying the plurality of seismic receivers on a conveyance device selected from: (i) a wireline, (ii) a pipe, and (iii) coiled tubing.

9. A system configured to evaluate an earth formation, the system comprising:
    a plurality of seismic receivers configured to be conveyed in a borehole and recording seismic signals responsive to an activation of at least one seismic source on the surface of the earth at at least one location offset from the borehole; and
    at least one processor configured to:
    (i) estimate, from travel times of seismic waves from the at least one location that have been reflected at an interface in the earth formation and the surface of the earth to the plurality of receivers, a velocity model including velocities of vertically propagating seismic waves in a plurality of intervals, and an anellipticity parameter related to a normal moveout velocity of compressional waves for the plurality of intervals; and
    (ii) use the estimated velocity model for producing an image of the earth formation above the plurality of seismic receivers.

10. The system of claim 9 wherein the at least one location further comprises at least one additional location close to the borehole, and wherein the at least one processor is further configured to:
    use travel times of seismic waves to the plurality of receivers from the at least one additional location and the velocity model to provide an updated velocity model including at least two anisotropy parameters related to a normal moveout curve of compressional waves for the plurality of intervals.

11. The system of claim 10 wherein the at least one processor is further configured to:
    use the updated velocity model to produce an image of the earth formation; and
    use the produced image for drilling operations.

12. The system of claim 10 wherein the at least one location comprises a plurality of locations defining a multi-azimuthal walkaway geometry, and the at least two anisotropy parameters further comprise five orthorhombic anisotropy parameters $\epsilon_1$, $\epsilon_1$, $\delta_1$, $\delta_2$ and $\delta_3$ related to a normal moveout velocity of compressional waves for the plurality of intervals.

13. The system of claim 10 wherein the at least one processor is further configured to estimate at least one of the at least two anisotropy parameters by approximating a moveout function representing the travel times by a shifted parabola.

14. The system of claim 9 wherein the at least one processor is further further configured to use the produced image for drilling operations.

15. The system of claim 9 wherein at least one of the plurality of seismic receivers further comprises a 3-component receiver.

16. The system of claim 9 further comprising a conveyance device configured to deploy the plurality of seismic receivers, the conveyance device selected from: (i) a wireline, (ii) a pipe, and (iii) coiled tubing.

17. A non-transitory computer-readable medium product having stored thereon instructions that when read by at least one processor cause the at least one processor to execute a method, the method comprising:

estimating, from first travel times of seismic waves from at least one location offset from a borehole that have been reflected at an interface in the earth formation and the surface of the earth to a plurality of receivers in the borehole and second travel times of seismic waves to the plurality of receivers from at least one additional location near the borehole, a velocity model including at least two anisotropy parameters related to a normal moveout curve of compressional waves for the plurality of intervals; and using the estimated velocity model for producing an image of the earth formation above the plurality of seismic receivers.

18. The non-transitory computer-readable medium product of claim 17 further comprising at least one of: (i) a ROM, (ii) an EPROM, (iii) an EAROM, (iv) a flash memory, and (v) an optical disks.

* * * * *